United States Patent
Feldman et al.

[11] Patent Number: 5,833,414
[45] Date of Patent: Nov. 10, 1998

[54] RATCHETING CARGO LOAD BRACING BAR

[75] Inventors: Edward T. Feldman, Buffalo Grove, Ill.; Thomas C. Keenan, Franklin, Tenn.; Philip B. LoPresti, Chicago, Ill.

[73] Assignee: Illinois Tool Works Inc., Glenview, Ill.

[21] Appl. No.: 932,628

[22] Filed: Sep. 17, 1997

[51] Int. Cl.⁶ .................................................. B60P 7/15
[52] U.S. Cl. ............................................ 410/151; 410/143
[58] Field of Search ................................ 410/143, 145, 410/149, 151; 254/12, 95, 108, 230, 247; 211/105.3; 248/354.1, 354.6; 74/167, 169, 141.5, 142

[56] References Cited

U.S. PATENT DOCUMENTS

| | | |
|---|---|---|
| 2,649,054 | 8/1953 | Rueckert . |
| 2,989,011 | 6/1961 | Henrikson . |
| 3,044,800 | 7/1962 | Wicker . |
| 3,049,328 | 8/1962 | Bishop . |
| 3,090,600 | 5/1963 | Smith . |
| 3,149,664 | 9/1964 | Keating . |
| 3,686,715 | 8/1972 | Brodnicki . |
| 4,067,263 | 1/1978 | Naffa et al. . |
| 4,120,076 | 10/1978 | Lebre . |
| 4,167,144 | 9/1979 | Martin et al. . |
| 4,168,667 | 9/1979 | Loomis . |
| 4,434,970 | 3/1984 | Boland et al. . |
| 4,436,466 | 3/1984 | Marino ..................................... 410/118 |
| 4,456,415 | 6/1984 | Joice-Cavanagh ....................... 410/129 |
| 4,473,331 | 9/1984 | Wisecarver ............................... 410/129 |
| 4,553,888 | 11/1985 | Crissy et al. ............................. 410/144 |
| 4,669,934 | 6/1987 | Wisecarver ............................... 410/151 |
| 4,702,653 | 10/1987 | Gaulding et al. ......................... 410/144 |
| 4,781,499 | 11/1988 | Wisecarver ............................... 410/151 |
| 4,854,792 | 8/1989 | Cottone ..................................... 410/118 |
| 4,887,947 | 12/1989 | Bott .......................................... 410/144 |
| 5,028,184 | 7/1991 | Krause ...................................... 410/143 |
| 5,028,185 | 7/1991 | Shannon ................................... 410/151 |
| 5,094,576 | 3/1992 | Fredelius ................................... 410/151 |
| 5,186,429 | 2/1993 | Linnepe et al. . |
| 5,378,095 | 1/1995 | Shultz ........................................ 410/151 |
| 5,443,342 | 8/1995 | Huang ...................................... 410/151 |
| 5,443,586 | 8/1995 | Cargill ...................................... 410/143 |
| 5,472,301 | 12/1995 | Wallen ..................................... 410/151 |
| 5,769,580 | 6/1998 | Purvis ...................................... 410/151 |

FOREIGN PATENT DOCUMENTS 636426  2/1962  Canada .............................. 211/105.3

OTHER PUBLICATIONS

Operation, Parts and Safety Manual, Signode Corporation, PH–2 Tensioner, pp. 1, 3, 5 & 7, no date.

Primary Examiner—Stephen T. Gordon

[57] ABSTRACT

A cargo load bracing bar comprises first, outer and second, inner telescoping tubular members, a housing attached to the outer tubular member, a pinion gear and actuating ratchet handle, having a spring-biased ratchet member mounted thereon, respectively rotatably and pivotally mounted upon the housing, and a gear rack attached at one end thereof to the inner tubular member while the opposite end of the gear rack is slidably disposed upon the outer tubular member. An angle bracket is mounted upon the housing, and a spring-biased pawl member is slidably disposed upon the gear rack and operatively associated with the angle bracket. The pawl member and the ratchet member are normally engaged with the pinion gear so as to achieve the ratcheting extension of the gear rack and the inner tubular member with respect to the outer tubular member. However, the ratchet member may be disengaged from the pinion gear so as to permit the ratchet handle to be moved to a collapsed position substantially parallel to the outer tubular member, and both the ratchet member and the pawl member may be disengaged from the pinion gear so as to permit the pinion gear to freely rotate, and the gear rack and inner tubular member to undergo free longitudinal movement, so as to permit the cargo load bracing bar to be rapidly extended or contracted.

20 Claims, 2 Drawing Sheets

RATCHETING CARGO LOAD BRACING BAR

FIELD OF THE INVENTION

The present invention relates generally to cargo load bracing bars which are employed within cargo holds or spaces in order to restrain cargo loads against inadvertent or undesirable movements during transportation of cargo loads, and more particularly to a new and improved cargo load bracing bar which can be operated in an easy and accurate manner when disposed in its loading or extension mode by means of which opposite ends of the cargo load bracing bar can frictionally engage opposite walls of a cargo vehicle with a predetermined amount of load or force so as to maintain the cargo load bracing bar in its cargo load restraining position; which can be easily disposed in a release mode by means of which the cargo load bracing bar can either be rapidly longitudinally extended to a length approximately corresponding to the distance defined between the cargo walls so as to then be ready for subsequent engagement with the cargo walls in accordance with the aforenoted loading or extension mode, or alternatively, be rapidly longitudinally contracted so as to readily permit longitudinal collapse of the cargo load bracing bar so as to facilitate removal of the cargo load bracing bar from the cargo hold or space and permit storage of the cargo load bracing bar in a compact manner or subsequent use thereof in connection with a subsequent cargo load bracing operation.

BACKGROUND OF THE INVENTION

Cargo load bracing bars are of course well known and widely employed within the transportation industry so as to restrain movements of cargo loads during transportation of the same. Such cargo load bracing bars conventionally comprise a pair of telescoping tubular members wherein the distal ends of the tubular members are provided with pad members fabricated from a suitable elastomeric or other frictional material. When the telescoping tubular members are longitudinally extended with respect to each other so as to engage opposite interior wall surfaces of the cargo vehicle under predetermined load conditions, the pad members frictionally engage such interior wall surfaces of the cargo vehicle so as to retain the cargo load bracing bar in the desired cargo restraining position with respect to the cargo loads.

One type of well-known cargo load bracing bar uses a ratchet mechanism to longitudinally extend or contract the telescoping tubular members wherein the ratchet mechanism is similar to that conventionally employed in connection with old style automobile bumper jacks. As is well known, however, such a ratchet mechanism can only longitudinally extend or contract the tubular members with respect to each other at a rate of one tooth at a time whereby use of such bumper jacks has proven to be quite tedious, laborious, and time-consuming. In addition, use of such a ratchet mechanism and bumper jack also requires the provision of an auxiliary lever which controls or determines the direction of operation of the jack, that is, whether the jack is being longitudinally extended or contracted. Operation or actuation of such an auxiliary lever has sometimes proven difficult, and sometimes, the lever has occasionally malfunctioned.

Another type of cargo load bracing bar is disclosed within U.S. Pat. No. 3,049,328 which was issued to Bishop on Aug. 14, 1962. The cargo load bracing bar disclosed within this patent is seen to comprise an outer tubular member 1, and an inner tubular telescoping member 2, wherein the free distal ends of the tubular members 1 and 2 are provided with frictional pads 3 for engaging the interior walls 4 of a truck body. A rack 11, having a plurality of serially arranged teeth 13, is fixedly mounted upon the inner tubular member 2 by means of a collar 8, and a handle 19 is pivotally mounted upon the outer tubular member 1 by means of a sleeve member 14. An end portion of the handle 19 is provided with a hub or sector gear 22 comprising a plurality of teeth 23, for example, four teeth, which are adapted to engage the teeth 13 of the rack 11 so as to move the rack 11, and therefore the inner tubular member 2, with respect to outer tubular member 1 when the handle 19 is moved from the position shown in FIG. 4 to that shown in FIG. 3. Collar 14 is provided with a catch projection 27 and handle 19 is correspondingly provided with a catch projection 24.

When the handle 19 is rotated from the position shown in FIG. 4 to that shown in FIG. 3, the rack 11, and therefore the inner tubular member 2, is moved relative to the outer tubular member 1, and the newly extended position of the inner tubular member 2, with respect to outer tubular member 1, is fixed and maintained as a result of the engagement of the catch projection 24 of the handle 19 with the catch projection 27 of the collar 14 so as to prevent retrograde movement of the rack 11, and therefore the inner tubular member 2, with respect to outer tubular member 1. As can be readily appreciated from the cargo load bracing bar system of Bishop, however, it is seen that in view of the fact that the locking or latching of the system only occurs when the handle 19 is disposed in the position illustrated in FIG. 3, an operative extension stroke of the system necessarily comprises or encompasses a linear movement of the rack 11 and inner tubular member 2, with respect to outer tubular member 1, which corresponds to four serial teeth of rack 11. Consequently, it is difficult to accurately or properly achieve a particularly desired extension of the cargo load bracing bar of Bishop so as to exert a proper or predeterminedly desired load or force, by means of its frictional pad members 3, upon the opposite interior walls of the truck body when, for example, a longitudinal extension stroke merely comprises a limited distance corresponding to one or two serial teeth of rack 11.

Still another type of cargo load bracing bar system is disclosed within U.S. Pat. No. 5,443,342 which issued to Huang on Aug. 22, 1995. In accordance with this system, a sleeve 21 is fixed to a tube 20, and a base 30 is mounted upon the sleeve 21, the base 30 having a pivotable handle 40 and a rotatable shaft 31 mounted thereon. A ratchet gear 32 is fixed upon the shaft 31, and the handle 40 is provided with a catch 41 which is adapted to engage the ratchet gear 32 so as to rotate the ratchet gear 32 when the handle 40 is moved in the clockwise direction as seen in FIGS. 1 and 3. The ratchet gear 32 is adapted to be engaged with the teeth of a gear rack 10. A stop 33 is also mounted upon the base 30 so as to engage the teeth of the ratchet gear 32 in order to prevent the ratchet gear 32 from rotating in the opposite direction when the handle 40 is rotated in the counterclockwise direction in preparation for a subsequent clockwise rotation or operation in order to extend gear rack 10 further with respect to tube 20.

Sleeve 21 is provided with a pair of ears 26 through which a pivot pin 27 is disposed and by means of which the base 30 is pivotally mounted upon the sleeve 21. Base 30 is also provided with a pair of projections 35 through which a pair of hooks 23, of a rod 22 mounted upon sleeve 21, are disposed for cooperating with the pivot pin 27 in order to retain the base 30 upon sleeve 21. In order to disengage ratchet gear from the gear rack 10 so as to permit gear rack 10 to freely slide relative to the tube 20, the hooks 23 must be disengaged from the projections 35 whereby the base 30 is then permitted to rotate about the pivot pin 27. It can be readily appreciated that with such a system, disengagement of the ratchet gear 32 from the gear rack 10 may be somewhat awkward and difficult to achieve. In addition, it is also desirable to move the actuating handle 40 to a collapsed position disposed parallel to or atop, for example, tube 20 so as to render the system compact once the cargo load bracing bar has been extended and fixed within the cargo space of the vehicle, as well as for preventing the creation or presence of a potentially harmful or dangerous situation by means of the handle 40 projecting outwardly or away from the tube 20 as shown in solid lines in FIG. 3 of the Huang patent, however, provision for such movement of the actuating handle 40 of Huang is not provided.

A need therefore exists in the art for a new and improved cargo load bracing bar which can be readily operated in an easy, quick, and accurate manner in order to longitudinally extend the bar to a predetermined length so as to impress necessary loads or forces upon the interior walls of a cargo vehicle and thereby restrain and retain cargo loads therein. In addition, it is desirable that the cargo load bracing bar be readily movable to a longitudinally collapsed state for compactness and safety during cargo restraint or storage modes, and to a released states for free movement modes attendant preliminary extension of the cargo load bracing bar prior to further extension of the cargo load bracing bar for load or frictional engagement with the interior walls of the cargo vehicle, or for longitudinal contraction of the cargo load bracing bar for permitting removal of the cargo load bracing bar from the cargo vehicle, and storage of the contracted cargo load bracing bar, prior to its reuse in connection with the restraint or retention of other cargo loads within other cargo vehicles.

OBJECTS OF THE INVENTION

Accordingly, it is an object of the present invention to provide a new and improved cargo load bracing bar.

Another object of the present invention is to provide a new and improved cargo load bracing bar which overcomes the various defects, drawbacks, and disadvantages chracteristic of prior art cargo load bracing bars.

A further object of the present invention is to provide a new and improved cargo load bracing bar which can be readily operated in an easy, quick, and accurate manner such that the inner tube component, to which the gear rack is fixed, can be longitudinally extended a lineal distance which is equal to one or more gear teeth of the gear rack, and wherein the cargo load bracing bar is also readily movable to collapsed and released states so as to enhance compactness, safety, and rapid and easy longitudinal extension and contraction of the cargo load bracing bar attendant preliminary use of the cargo load bracing bar within a cargo vehicle in connection with a cargo restraint operation, or removal of the cargo load bracing bar from the cargo vehicle, and storage of the same, upon completion of a cargo restraint operation.

SUMMARY OF THE INVENTION

The foregoing and other objects are achieved in accordance with the teachings of the present invention through the provision of a cargo load bracing bar assembly or system which comprises inner and outer telescoping tubular members, a housing fixedly secured to the outer tubular member, and an elongated gear rack having one end thereof fixedly secured to the inner tubular member so as to be movable with the inner tubular member when the same is telescopingly moved with respect to the outer tubular member, and an opposite end thereof freely disposed atop the outer tubular member so as to be slidably movable along the outer tubular member. A pinion gear, having gear teeth disposed thereon for engagement with similar teeth of the gear rack, is rotatably mounted upon the housing, as is an actuating ratchet handle. A spring-biased ratchet is mounted upon the actuating ratchet handle so as to be normally engaged with the pinion gear, and a spring-biased pawl is confined between side wall portions of the housing and is slidably disposed upon the gear rack such that a projecting portion of the pawl is normally engaged with the pinion gear so as to prevent rotation of the pinion gear in a direction opposite that caused by the ratchet member.

When the actuating ratchet handle is moved in the counterclockwise direction, the spring-biased ratchet member is able to ratchet over one or more teeth of the pinion gear, without rotating the pinion gear, in preparation for causing rotatable movement of the pinion gear which, in turn, will cause predetermined lineal movement of the gear rack and the inner tubular member with respect to the outer tubular member. When the actuating ratchet handle is moved in the clockwise direction, the ratchet causes clockwise rotation of the pinion gear whereby a predetermined lineal extension of the gear rack, and the inner tubular member, relative to the outer tubular member is achieved. Upon completion of such rotatable movement of the pinion gear, and the corresponding lineal movement of the gear rack and the inner tubular member with respect to the outer tubular member, the actuating ratchet handle is again moved in the counterclockwise direction causing the ratchet member to again ratchet over one or more teeth of the pinion gear in preparation for another operative cycle by means of which the gear rack and the inner tubular member can be moved a predetermined amount with respect to the outer tubular member. It is noted that while the ratchet handle is being moved in the counterclockwise direction, the spring-biased pawl member engages one of the teeth of the pinion gear so as to prevent rotation of the pinion gear in the counterclockwise direction thereby preventing retrograde movement of the gear rack and contraction of the inner tubular member with respect to the outer tubular member.

In accordance with additionally unique features of the cargo load bracing bar of the present invention, the spring-biased ratchet member can be manually disengaged from the pinion gear so as to permit the actuating ratchet handle to be moved to a collapsed state wherein the actuating ratchet handle is disposed above and parallel to the gear rack. This serves to render the cargo load bracing bar relatively compact and also eliminates a potential safety hazard in view of the fact that the actuating ratchet handle would otherwise extend in an angular mode outwardly away from the inner and outer tubular members. In addition, the actuating ratchet handle may also be moved in the counterclockwise direction to a position at which the ratchet member is disengaged from the pinion gear and a head portion of the spring-biased ratchet member engages the spring-biased pawl member so as to push the spring-biased pawl member, against the biasing force of its associated spring, out of engagement with the pinion gear. In view of the fact that both the ratchet member and the pawl member are disengaged from the pinion gear, the gear rack, and therefore the inner tubular member operatively connected thereto, can be freely moved with respect to the outer tubular member whereby the longitudinal extension of the cargo load bracing bar can be easily and rapidly adjusted to a length approximating the interior expanse of the cargo hold or space of the cargo vehicle in preparation for subsequent accurate longitudinal extension of the cargo load bracing bar into frictional engagement with the interior side walls of the cargo vehicle. In accordance with an alternative operative mode, again, in view of the fact that both the ratchet member and the pawl member are disengaged from the pinion gear, the gear rack, and the inner tubular member operatively connected thereto, can be freely moved in the opposite longitudinal direction relative to the outer tubular member whereby the cargo load bracing bar can be easily and rapidly contracted so as to facilitate removal from the cargo vehicle and storage of the cargo load bracing bar in a compact state prior to its reuse in connection with a subsequent cargo load bracing operation.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
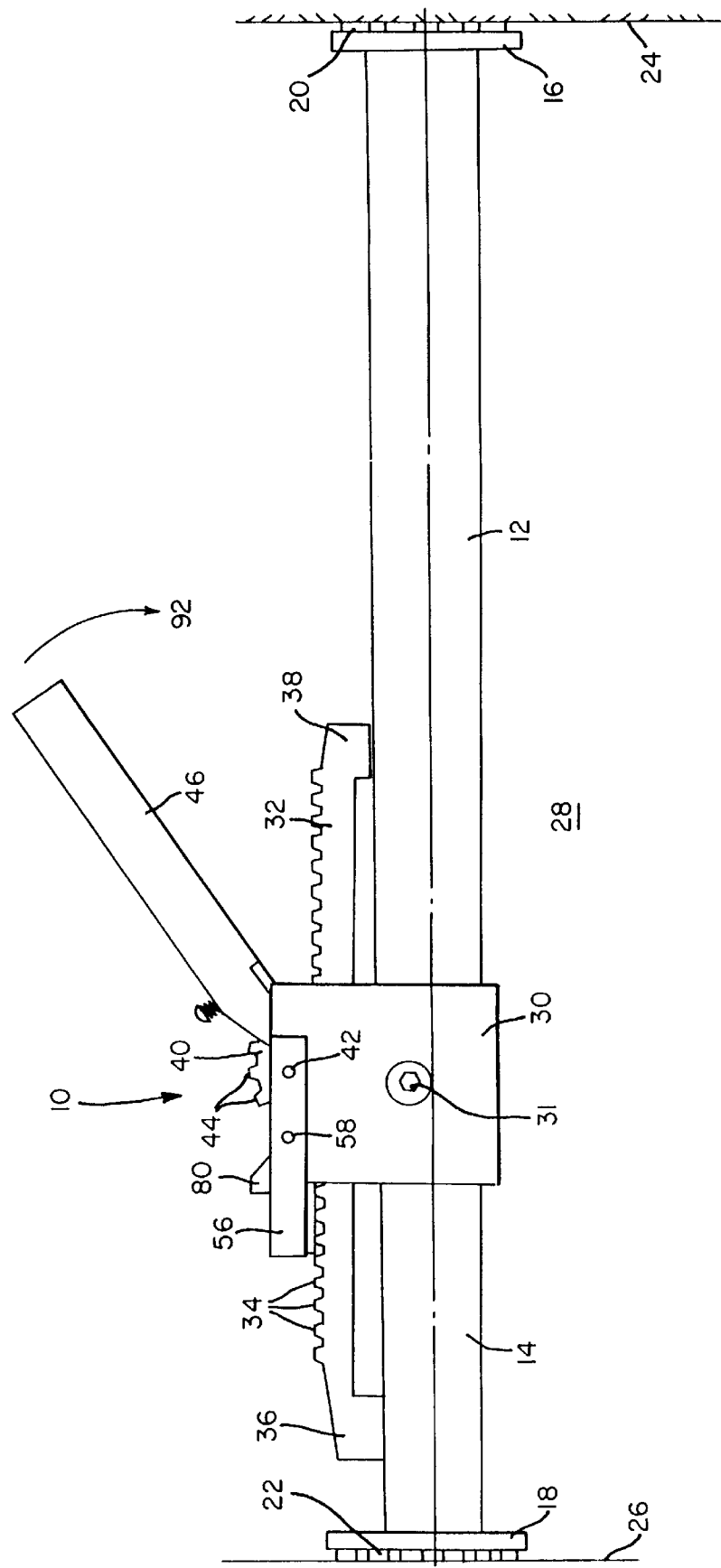
FIG. 1 is a side elevational view of the new and improved cargo load bracing bar constructed in accordance with the principles and teachings of the present invention and illustrated as being used within the cargo hold or space of a cargo vehicle.

Referring now to the drawings, and more particularly to FIG. 1 thereof, the new and improved cargo load bracing bar constructed in accordance with the teachings and principles of the present invention is illustrated therein and is generally indicated by the reference character 10. The cargo load bracing bar 10 is seen to comprise a first outer tubular member 12, and a second inner tubular member 14 which is adapted to be telescopically movable within and with respect to the outer tubular member 12. The free oppositely disposed ends of the outer and inner tubular members 12 and 14 are respectively provided with pad members 16 and 18 which are in turn provided with suitable elastomeric or frictional elements 20 and 22 for frictionally engaging interior wall surfaces 24 and 26 of a vehicle cargo hold or space 28 when the inner and outer tubular members 12 and 14 are longitudinally extended with respect to each other as will be more fully appreciated hereinafter.

A housing 30 is fixedly attached to the outer tubular member 12 by means of a suitable bolt fastener or the like 31, and a gear rack 32, having a plurality of serially arranged gear teeth 34, is fixedly secured at a first end 36 thereof, by suitable means, not shown, to the inner tubular member 14 in such a manner that the gear rack 32 passes through the housing 30 whereby a second opposite end 38 thereof is freely slidable atop the outer tubular member 12. A pinion gear 40 is rotatably mounted upon the housing 30 by means of another suitable bolt fastener 42, and the pinion gear 40 is of course provided with a plurality of gear teeth 44 disposed around its outer periphery so as to be engageable or enmeshed with the gear teeth 34 of the gear rack 32. An actuating ratchet handle 46 is also rotatably or pivotally mounted upon the housing 30 by means of the bolt fastener 42 such that the actuating ratchet handle 46 is rotatable or pivotal about an axis which is coaxial with the rotatable axis of the pinion gear 40 as defined by means of bolt fastener 42.

Figure 2:
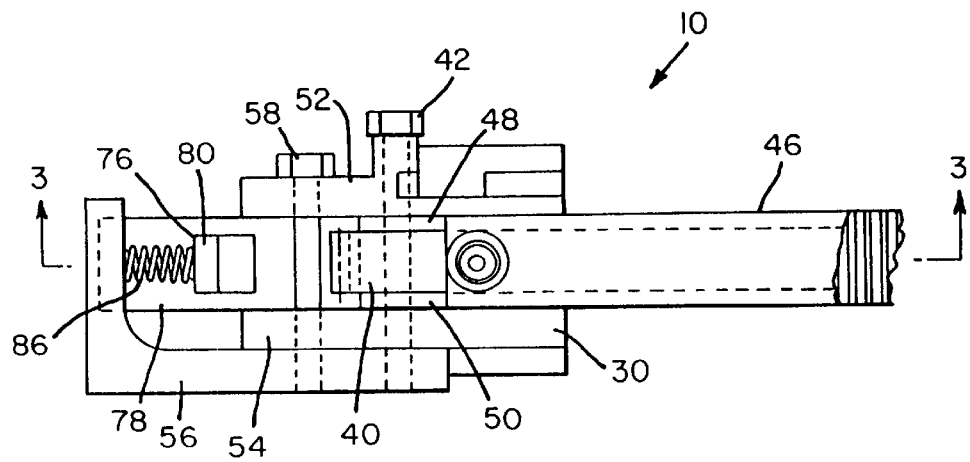
FIG. 2 is a partial, top plan view of the new and improved cargo load bracing bar shown in FIG. 1.
Figure 3:
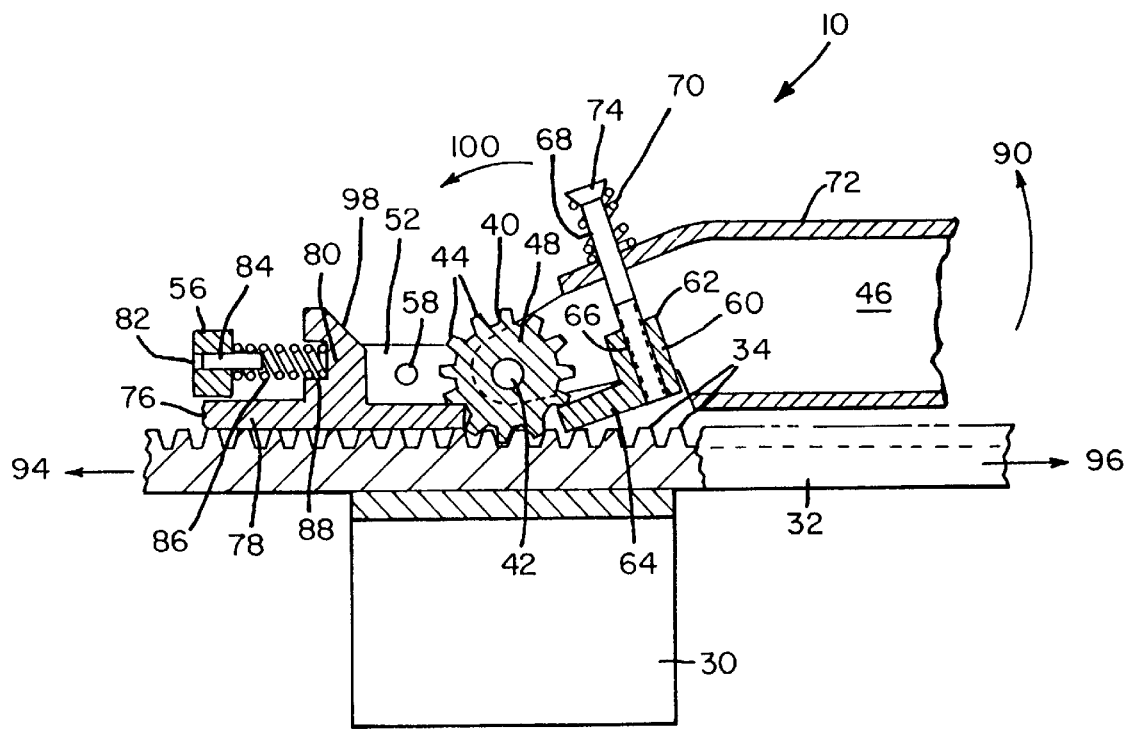
FIG. 3 is a cross-sectional view of the cargo load bracing bar shown in FIG. 2 as taken along the lines 3—3 of FIG. 2.

With reference now being additionally made to FIGS. 2 and 3, it is seen that the end of the actuating ratchet handle 46 which is pivotally mounted upon the housing 30 by means of the bolt fastener 42 actually comprises a clevis structure which is defined by means of two axially spaced ears 48 and 50 between which the pinion gear 40 is disposed and retained. In a similar manner, the housing 30 comprises a pair of axially spaced, upstanding side walls 52 and 54 between which the clevis structure of the actuating ratchet handle 46 is disposed and retained as a result of the bolt fastener 42 passing through the housing side wall 52, the ear 48 of the actuating ratchet handle 46, the pinion gear 40, the other ear 50 of the actuating ratchet handle 46, and the other side wall 54 of the housing 30. A substantially L-shaped angle bracket 56, the purpose of which will be more fully appreciated hereinafter, is secured to the exterior surface of housing side wall 54 by means of bolt fastener 42 and another bolt fastener 58 wherein the latter fastener 58 likewise passes through the upstanding housing side walls 52 and 54 as best illustrated in FIG. 2.

With reference now being additionally made specifically to FIG. 3, in order to operate the cargo load bracing bar 10 in the desired modes, the cargo load bracing bar 10 is seen to further comprise a ratchet member 60 which comprises a substantially rectangular body structure 62 having a plate or finger portion 64 projecting laterally outwardly from a side portion of the body structure 62 such that the plate or finger portion 64 is adapted to engage the teeth 44 of the pinion gear 40. The body structure 62 of the ratchet member 60 is provided with an internally threaded bore 66 within which the lower end of a threaded screw or bolt fastener 68 is disposed so as to mount the ratchet member 60 upon the actuating ratchet handle 46. A ratchet spring 70 is disposed about the upper end of the threaded screw or bolt fastener 68 so as to be interposed between an outer surface portion 72 of the actuating ratchet handle 46 and a head portion 74 of the threaded screw or bolt fastener 68. In this manner, the ratchet member 60 is spring-biased in the upward direction whereby the plate or finger portion 64 thereof is normally maintained engaged with a tooth 44 of the pinion gear 40, and in addition, the ratchet member 60 is able to be moved downwardly against the biasing force of ratchet spring 70 for purposes which will be more fully appreciated hereinafter.

On the other side of the rotational axis of pinion gear 40, that is, on the side of the pinion gear 40 which is opposite the side upon which the ratchet member 60 is disposed, there is disposed a pawl member 76 which comprises a flat plate portion 78 and an upstanding portion 80, wherein the flat plate portion 78 is slidably disposed upon the upper surface of the gear rack 32 and is slidably confined between the upstanding side walls 52 and 54 of the housing 30 as best seen in FIG. 2. The angle bracket 56 is provided with a throughbore 82 within which a peg or stud 84 is fixedly secured by any suitable means. A coil spring 86 has one end thereof disposed about the peg or stud 84 while the opposite end of the spring 86 is disposed within a notched or recessed portion 88 defined within the upstanding portion 80 of the pawl member 76. In this manner, the pawl member 76 is spring-biased toward the pinion gear 40 such that the right end of the flat plate portion 78 of the pawl member 76, as viewed in FIG. 3, is normally engaged or enmeshed with the pinion gear 40.

In operation, when the outer and inner tubular members 12 and 14 of the cargo load bracing bar 10 are disposed in a relatively extended position with respect to each other such that the opposite ends thereof are disposed adjacent to the side walls 24 and 26 of the cargo vehicle and wherein it is desired to further extend the outer and inner tubular members 12 and 14 with respect to each other such that the frictional elements 20 and 22 can engage the side walls 24 and 26 of the cargo vehicle with an increased amount of force and thereby maintain the cargo load bracing bar 10 at a predetermined position with respect to cargo loads to be restrained thereby, the actuating ratchet handle 46 is pivoted or rotated upwardly in the counterclockwise direction, as denoted by the arrow 90, from its position shown in FIG. 3 to that shown in FIG. 1.

As can be readily appreciated, in accordance with such counterclockwise movement of the actuating ratchet handle 46, and in view of the spring-biased mounting of the ratchet member 60 upon the actuating ratchet handle 46, the plate or finger portion 64 of the ratchet member 60 is able to ratchet over one or more teeth 44 of the pinion gear 40 depending upon the angular extent to which the actuating ratchet handle 46 is moved in the direction of arrow 90. At this time it is also appreciated that the pinion gear 40 is restrained or prevented from undergoing any rotational movement in the counterclockwise direction in view of the enmeshed engagement of the flat plate portion 78 of the pawl member 76 with the teeth 44 of the pinion gear 40.

When the actuating ratchet handle 46 is then subsequently pivoted or rotated downwardly in the clockwise direction, as denoted by the arrow 92, from the position shown in FIG. 1 to that shown in FIG. 3, the plate or finger portion 64 of the ratchet member 60 will engage one of the teeth 44 of the pinion gear 40, depending again upon the angular extent to which the actuating ratchet handle 46 was initially moved in the counterclockwise direction 90, and as the actuating ratchet handle 46 is moved downwardly and in the clockwise direction 92, the plate or finger portion 64 of the ratchet member 60 will cause angular rotation of the pinion gear 40 in the clockwise direction which will, in turn, cause linear movement of the gear rack 32 in the leftward direction as denoted by the arrow 94 so as to longitudinally extend the inner tubular member 14 with respect to the outer tubular member 12.

It is to be noted in conjunction with the foregoing operation that the clockwise rotation of the pinion gear 40 is permitted and not prevented by means of the flat plate portion 78 of the pawl member 76 in view of the fact that as the pinion gear 40 tends to rotate in the clockwise direction, the teeth 44 of the pinion gear 40 which are serially engaged with the flat plate portion 78 of the pawl member 76 will cause slidable movement of the flat plate portion 78, and the pawl member 76 itself, toward the left as viewed in FIG. 3 and against the biasing force of the coil spring 86. When a particular one of the teeth 44 of the pinion gear 40 then clears the flat plate portion 78 of the pawl member 76, the spring biasing force of the coil spring 86 will move the pawl member 76 back toward the right as viewed in FIG. 3 and thereby cause the flat plate portion 78 of the pawl member 76 to engage the next tooth 44 of the pinion gear 40.

If the pinion gear 40 continues to rotate in the clockwise direction, then this cyclical engagement between the pinion gear 40 and the pawl member 76 continues, however, if there is no further rotational movement of the pinion gear 40 in the clockwise direction as determined by means of the angular disposition of the ratchet member 60, then the pawl member 76 engages the pinion gear 40 so as to prevent rotational movement of the pinion gear 40 in the counterclockwise direction and retrograde lineal movement of the gear rack 32 in the contraction direction as denoted by the arrow 96. Repeated cyclical movements of the actuating ratchet handle 46 will result in repeated lineal movements of the gear rack 32 and the inner tubular member 14 relative to the outer tubular member 12 until the opposite ends of the cargo load bracing bar 10 are engaged with the interior wall surfaces 24 and 26 of the cargo vehicle with a predeterminedly desired degree of force.

As can thus be appreciated, the ratcheting system of the present invention, as determined by the actuating ratchet handle 46, the ratchet member 60, and the pinion gear 40, results in an easy and accurate lineal movement of the gear rack 32 and its operatively connected inner tubular member 14 which may comprise a lineal distance equal to one gear tooth or several gear teeth which is quite different from the system of Bishop as disclosed within U.S. Pat. No. 3,049, 328. In accordance with the principles, teachings, and structure of the cargo load bracing bar of the present invention, the pinion gear 40 and the ratchet member 60 are related to each other such that one operative stroke of the actuating ratchet handle 46 and the associated ratchet member 60 can cause rotatable movement of the pinion gear 40, and a lineal movement of the gear rack 32, through a distance equivalent to three or four gear teeth.

Another novel and unique feature of the present invention resides in the fact that the actuating ratchet handle 46 can be pivotally moved in the downward and clockwise direction from the position shown in FIG. 1 to the position shown in FIG. 3, even when rotation of the pinion gear 40 in the clockwise direction 92 and lineal movement of the gear rack 32 in the extended direction 94 can no longer be readily achieved in view of the fact that, for example, the outer and inner tubular members 12 and 14 are already longitudinally extended to their maximum extent with respect to each other whereby the elements 20 and 22 are tightly and frictionally engaged with the side walls 24 and 26 of the cargo vehicle, and in the instance that the actuating ratchet handle 46 is disposed at an angular orientation or position which is similar to that shown in FIG. 1. For compactness and safety purposes, however, it is desirable that upon completion of an installation operation of a cargo load bracing bar, as shown in FIG. 1, the actuating ratchet handle 46 be disposed at an angular orientation or position which is as illustrated in FIG. 3 whereby the actuating ratchet handle 46 will be disposed substantially parallel to and atop the gear rack 32.

In order to achieve this disposition of the actuating ratchet handle 46, that is, in order to move the actuating ratchet handle 46 from its position illustrated in FIG. 1 to that shown in FIG. 3, without causing any rotation of the pinion gear 40 and any consequent lineal movement of the gear rack 32 and its associated tubular member 14, a manual force is simply exerted upon the head portion 74 of the screw or bolt fastener 68 of the ratchet member 60 so as to in effect move the ratchet member 60 downwardly against the upward biasing force of the ratchet spring 70 whereby the plate or finger portion 64 of the ratchet member 60 is disengaged from its normally engaged disposition with respect to the pinion gear 40. Consequently, while the screw or bolt fastener 68 of the ratchet member 60 is maintained depressed so as to maintain the plate or finger portion 64 of the ratchet member 60 in its disengaged state with respect to the pinion gear 40, the actuating ratchet handle 46 can be rotated or pivoted in the clockwise direction 92 to the position shown in FIG. 3. Upon attaining such position, pressure upon the head portion 74 of the screw or bolt fastener 68 may then be removed whereby the ratchet spring 70 will again bias the ratchet member 60 upwardly such that the plate or finger portion 64 will again engage the pinion gear 40.

A last novel and unique feature characteristic of the present invention resides in the fact that the cargo load bracing bar 10 can be rapidly and easily longitudinally extended and contracted. This mode of operation is achieved as a result of both the plate or finger portion 64 of the ratchet member 60 and the flat plate portion 78 of the pawl member 76 being simply and easily simultaneously disengaged from their respective engaged states with the pinion gear 40 so as to permit the pinion gear 40, and therefore the gear rack 32 and its associated tubular member 14, to respectively freely and rapidly rotate, and move longitudinally, such that the inner tubular member 14 can be rapidly moved longitudinally in both the extension and contraction directions with respect to the outer tubular member 12.

Rapid longitudinal extension of the cargo load bracing bar 10, that is, the rapid longitudinal extension of the inner tubular member 14 with respect to the outer tubular member 12, is desired when the cargo load bracing bar 10 is initially being used within a particular cargo hold or space 28 so as to preliminarily extend the cargo load bracing bar 10 to a length which approximates the distance defined between the opposite side walls 24 and 26 of the cargo hold or space 28. Once such preliminary extension of the cargo load bracing bar 10 has been achieved, the inner tubular member 14 of the cargo load bracing bar 10 may then be incrementally extended with respect to the outer tubular member 12 of the cargo load bracing bar 10 in accordance with the aforenoted ratcheting operations achieved by means of the pinion gear 40, the gear rack 32, the ratchet member 60, and the pawl member 76. In an alternative mode of operation, rapid longitudinal contraction of the cargo load bracing bar 10, that is, the rapid longitudinal contraction of the inner tubular member 14 with respect to the outer tubular member 12, is desired when, for example, a particular cargo load transportation operation has been completed and the cargo load bracing bar 10 is to be removed from the cargo hold or space 28 so that the cargo load bracing bar 10 may be stored or readied for a subsequent cargo load bracing operation within a different cargo hold or space 28.

In order to disengage both the plate or finger portion 64 of the ratchet member 60 and the plate portion 78 of the pawl member 76 from the pinion gear 40 so as to permit the pinion gear 40 to freely rotate and the gear rack 32 to undergo free longitudinal movement so as to achieve, in turn, such rapid longitudinal extension and contraction of the inner tubular member 14 with respect to the outer tubular member 12, the actuating ratchet handle 46 is rotated or pivoted in the counterclockwise direction 90. This movement of the actuating ratchet handle 46 can be achieved either by simply moving the actuating ratchet handle 46 in the counterclockwise direction 90 and permitting the flat plate or finger portion 64 of the ratchet member 60 to ratchet over the several teeth 44 of the pinion gear 40 until the flat plate or finger portion 64 of the ratchet member 60 clears pinion gear 40, or alternatively, a downward force may again be applied to the head portion 74 of the ratchet screw or bolt fastener 68 so as to initially disengage the flat plate or finger portion 64 of the ratchet member 60 from the gear teeth 44 of the pinion gear 40.

In either case, once the actuating ratchet handle 46 has been rotated or pivoted to an angular position at which the flat plate or finger portion 64 of the ratchet member 60 is entirely clear of the gear teeth 44 of the pinion gear 40, rotation or pivoting of the actuating ratchet handle 46 is continued until the head portion 74 of the ratchet screw or bolt fastener 68 encounters an inclined or slanted surface portion 98 of the upstanding member or portion 80 of the pawl member 76, such movement of the head portion 74 of the ratchet screw or bolt fastener 68 being denoted by means of the arrow 100. As a result of the head portion 74 of the ratchet screw or bolt fastener 68 forcefully encountering the slanted or inclined surface portion 98 of the upstanding member or portion 80 of the pawl member 76, the pawl member 76 will be forcefully moved toward the left against the biasing force of the pawl spring 86 whereby the flat plate portion 78 of the pawl member 76 will be disengaged from the pinion gear 40. Therefore, in view of the fact that both the plate or finger portion 64 of the ratchet member 60 and the flat plate portion 78 of the pawl member 76 have been effectively disengaged from the teeth 44 of the pinion gear 40, the pinion gear 40 is permitted to freely rotate whereby the gear rack 32 and its operatively associated inner tubular member 14 are able to be rapidly freely extended or contracted as desired so as to achieve the aforenoted operational states attendant use of the cargo load bracing bar 10.

Thus it may be seen that in accordance with the principles and teachings of the present invention, a new and improved cargo load bracing bar has been developed whereby extension of the inner tubular member with respect to the outer tubular member can be easily and accurately achieved in increments of a single tooth or multiple teeth depending upon the angular extent to which the actuating ratchet handle, and the ratchet member carried thereby, is moved or positioned with respect to the pinion gear. In addition, the actuating ratchet handle may be moved to a collapsed state so as to render the same compact as well as to eliminate any potential safety hazards, and still further, the actuating ratchet handle may be moved to a release state or position at which the ratchet and pawl members are effectively disengaged from the pinion gear so as to permit the pinion gear to freely rotate whereby the gear rack can be freely moved longitudinally so as to permit the cargo load bracing bar to be rapidly extended or contracted as a result of the inner tubular member being rapidly extended or contracted with respect to the outer tubular member.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States of America is:

1. A cargo load bracing bar, comprising:

a first tubular member;

a second tubular member telescopically movable within said first tubular member;

a gear rack attached to said second tubular member;

a pinion gear rotatably mounted upon said first tubular member and enmeshed with said gear rack for longitudinally moving said gear rack, and said second tubular member attached to said gear rack, in opposite longitudinal directions relative to said first tubular member when said pinion gear is rotated in opposite angular directions;

pawl means releasably engaged with said pinion gear for permitting said pinion gear to rotate in a first one of said opposite angular directions and for preventing said pinion gear from rotating in a second one of said opposite angular directions;

handle means pivotally mounted upon said first tubular member for movement in opposite angular directions;

ratchet means mounted upon said handle means for ratcheting over a predetermined number of gear teeth of said pinion gear when said handle means is pivoted in a first one of said opposite angular directions and when said pawl means is engaged with said pinion gear so as to prevent rotation of said pinion gear in said second one of said opposite directions, and for engaging said pinion gear so as to rotatably drive said pinion gear in said first one of said opposite angular directions when said handle means is pivoted in a second one of said opposite angular directions and said pawl means is engaged with said pinion gear so as to permit rotation of said pinion gear in said first one of said opposite directions; and means mounting said ratchet means upon said handle means for permitting said ratchet means to be disengaged from said pinion gear so as not to rotatably drive said pinion gear in said first one of said opposite angular directions when said handle means is pivoted in said second one of said opposite angular directions and thereby permit said handle means to be moved in said second one of said opposite angular directions so as to be disposed substantially parallel to said first tubular member.

2. The cargo load bracing bar as set forth in claim 1, wherein:

a housing is fixedly secured upon said first tubular member; and said pinion gear and said handle means are respectively rotatably and pivotally mounted upon said housing.

3. The cargo load bracing bar as set forth in claim 1, wherein:

said means mounting said ratchet means upon said handle means comprises spring means for spring-biasing said ratchet means into engagement with said pinion gear.

4. The cargo load bracing bar as set forth in claim 1, wherein:

said pawl means is slidably disposed atop said gear rack.

5. The cargo load bracing bar as set forth in claim 2, wherein:

said housing comprises a pair of oppositely disposed side walls; and said pawl means is slidably confined between said pair of oppositely disposed side walls of said housing.

6. The cargo load bracing bar as set forth in claim 5, further comprising:

spring means for spring-biasing said pawl means into engagement with said pinion gear.

7. The cargo load bracing bar as set forth in claim 1, wherein:

said handle means is pivotally mounted upon said first tubular member so as to be movable to a predetermined position at which said ratchet means is disengaged from said pinion gear and wherein said ratchet means is engaged with said pawl means so as to disengage said pawl means from said pinion gear whereby said pinion gear is free to rotate in either one of said opposite angular directions and said gear rack is free to move longitudinally in either one of said opposite longitudinal directions so as to in turn permit said second tubular member to be rapidly moved in either one of said opposite longitudinal directions with respect to said first tubular member so as to achieve rapid extension and contraction of said cargo load bracing bar.

8. The cargo load bracing bar as set forth in claim 6, wherein:

an angle bracket is attached to said housing; and said spring means for said pawl means is interposed between said pawl means and said angle bracket attached to said housing.

9. The cargo load bracing bar as set forth in claim 3, wherein said ratchet means comprises:

a body member having a finger projecting laterally outwardly from said body member for engaging said pinion gear; and a bolt having a shank end portion upon which said body member is mounted, and a head end portion;

said spring means for said ratchet means being interposed between said head end portion of said bolt and an external surface portion of said handle means.

10. The cargo load bracing bar as set forth in claim 1, wherein:

said pinion gear is rotatable about a rotational axis; and said pawl means and said ratchet means are disposed upon opposite sides of said rotational axis of said pinion gear for engaging teeth of said pinion gear which are disposed upon opposite sides of said rotational axis of said pinion gear.

11. A cargo load bracing bar, comprising:

a first tubular member;

a second tubular member telescopically movable within said first tubular member;

a gear rack attached to said second tubular member;

a pinion gear rotatably mounted upon said first tubular member and enmeshed with said gear rack for longitudinally moving said gear rack, and said second tubular member attached to said gear rack, in opposite longitudinal directions relative to said first tubular member when said pinion gear is rotated in opposite angular directions;

pawl means releasably engaged with said pinion gear for permitting said pinion gear to rotate in a first one of said opposite angular directions and for preventing said pinion gear from rotating in a second one of said opposite angular directions;

handle means pivotally mounted upon said first tubular member for movement in opposite angular directions;

ratchet means mounted upon said handle means for ratcheting over a predetermined number of gear teeth of said pinion gear when said handle means is pivoted in a first one of said opposite angular directions and when said pawl means is engaged with said pinion gear so as to prevent rotation of said pinion gear in said second one of said opposite directions, and for engaging said pinion gear so as to rotatably drive said pinion gear in said first one of said opposite angular directions when said handle means is pivoted in a second one of said opposite angular directions and said pawl means is engaged with said pinion gear so as to permit rotation of said pinion gear in said first one of said opposite directions; and means for disengaging both said ratchet means and said pawl means from said pinion gear for permitting said pinion gear to freely rotate in either one of said opposite angular directions, and for permitting said gear rack, and said second tubular member attached to said gear rack, to freely undergo longitudinal movement in either one of said opposite longitudinal directions whereby said second tubular member can be rapidly telescopically moved longitudinally with respect to said first tubular member such that said cargo load bracing bar can be rapidly extended and contracted.

12. The cargo load bracing bar as set forth in claim 11, wherein:

said handle means is pivotally mounted upon said first tubular so as to be movable to a predetermined position at which said ratchet means, mounted upon said handle means, is disengaged from said pinion gear and engages said pawl means so as to cause disengagement of said pawl means from said pinion gear.

13. The cargo load bracing bar as set forth in claim 11, wherein:

said means for disengaging comprises spring means for spring-biasing said ratchet means into engagement with said pinion gear.

14. The cargo load bracing bar as set forth in claim 11, wherein:

said pinion gear is rotatable about a rotational axis; and said ratchet means and said pawl means are disposed upon opposite sides of said rotational axis of said pinion gear for engaging teeth of said pinion gear which are disposed upon opposite sides of said rotational axis of said pinion gear.

15. The cargo load bracing bar as set forth in claim 11, wherein:

said pawl means is slidably disposed atop said gear rack.

16. The cargo load bracing bar as set forth in claim 11, wherein:

a housing, having a pair of oppositely disposed side walls, is fixedly secured upon said first tubular member; and said pawl means is slidably confined between said pair of oppositely disposed side walls of said housing.

17. The cargo load bracing bar as set forth in claim 16, wherein:

said pinion gear and said handle means are respectively rotatably and pivotally mounted upon said housing.

18. The cargo load bracing bar as set forth in claim 16, further comprising:

spring means for spring-biasing said pawl means into engagement with said pinion gear.

19. The cargo load bracing bar as set forth in claim 18, wherein:

an angle bracket is attached to said housing; and said spring means for said pawl means is interposed between said pawl means and said angle bracket attached to said housing.

20. The cargo load bracing bar as set forth in claim 13, wherein said ratchet means comprises:

a body member having a finger projecting laterally outwardly from said body member for engaging said pinion gear; and a bolt having a shank end portion upon which said body member is mounted, and a head end portion;

said spring means for said ratchet means being interposed between said head end portion of said bolt and an external surface portion of said handle means.

\* \* \* \* \*